United States Patent Office 3,096,372
Patented July 2, 1963

3,096,372
NOVEL N-(SUBSTITUTED)-PHENYLSULFONYL-
N'-1-ADAMANTYLUREAS
Koert Gerzon, Indianapolis, Ind., assignor to Eli Lilly and
Company, Indianapolis, Ind., a corporation of Indiana
No Drawing. Filed Aug. 15, 1961, Ser. No. 131,466
6 Claims. (Cl. 260—553)

This invention relates to certain novel N-(substituted)-phenylsulfonyl-N' - 1 - adamantylureas. The compounds provided by this invention can be represented by the following formula:

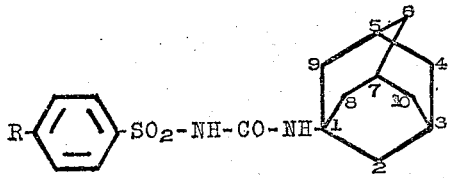

wherein R is a member of the group consisting of hydrogen, alk, alk-O—, alk-S—, and halo, and alk is a lower alkyl group. Compounds represented by the above formula include N - p-ethylphenylsulfonyl-N'-1-adamantylurea, N-p-tolylsulfonyl-N'-1-adamantylurea, N-p-chlorophenylsulfonyl-N'-1-adamantylurea, N-p-fluorophenylsulfonyl-N'-1-adamantylurea, N-p-bromophenylsulfonyl-N'-1-adamantylurea, N-p-isopropylphenylsulfonyl-N'-1-adamantylurea, N-p-(n-propylphenyl)sulfonyl-N'-adamantylurea, N-p-methylmercaptophenylsulfonyl-N'-1-adamantylurea, N-p-ethylmercaptophenylsulfonyl-N'-1 - adamantylurea, N-p-methoxyphenylsulfonyl-N'-1-adamantylurea, N-p-ethoxyphenylsulfonyl-N'-1-adamantylurea, N-phenylsulfonyl-N'-1-adamantylurea, and the like. It is preferred that the R group in the above formula contain no more than three carbon atoms.

The presence of the adamantyl group in a sulfonylurea produces an extremely efficacious compound. Thus, sulfonylureas containing the adamantyl group are not only more active on a weight basis than other clinically useful sulfonylureas, but also have fewer and less severe toxic side effects. In particular, this favorable effect of the adamantyl group manifests itself when R in the above formula is a lower-alkyl group. Thus, the n-p-(lower alkyl)phenylsulfonyl-N'-1-adamantylureas form a preferred group of compounds provided by this invention.

The compounds represented by the above formula are preferably prepared by reacting an ethyl N-(substituted)-phenylsulfonylcarbamate with 1-adamantylamine to form a salt and then pyrolyzing the salt by heating it above its decomposition point, preferably in an inert solvent, thus producing the desired N-(substituted)phenylsulfonyl-N'-1-adamantylurea.

The compounds of this invention can be prepared by methods other than the preferred method disclosed above; for example, adamantylisocyanate can be reacted with a para-substituted phenylsulfonamide in the presence of an alkaline carbonate to form an N-(substituted)phenylsulfonyl-N'-1-adamantylurea. In addition, there is also available for the preparation of the compounds of this invention the reaction of a para-substituted phenylsulfonamide with 1-adamantylurethane, the reaction of a para-substituted phenylsulfonylisocyanate with 1-adamantylamine, as well as the reaction of two molecules of a para-substituted phenylsulfonamide with phosgene to yield a diphenyl-substituted sulfonylurea, which compound is then pyrolyzed in the presence of 1-adamantylamine.

Also included within the scope of this invention are the nontoxic cationic salts of the above N-(substituted)phenylsulfonyl-N'-1-adamantylureas. The salts can be formed by reacting the sulfonylurea compound with a suitable base or basic salt, such as ammonium hydroxide, potassium hydroxide, magnesium hydroxide, sodium carbonate and the like. Among the preferred nontoxic cationic salts are the sodium, potassium, calcium, magnesium and ammonium salts. Both the N-substituted phenylsulfonyl-N'-1-adamantylureas and their non-toxic cationic salts are white, high-melting solids. The sulfonylureas are soluble in most polar organic solvents, whereas their cationic salts are somewhat soluble in aqueous organic solvents.

The novel compounds of this invention have hypoglycemic properties which make them useful anti-diabetic agents. The compounds are active when administered by the oral route and can be employed to regulate the blood sugar level of depancreatized dogs when thus administered. In addition, adequate regulation of the blood sugar levels of diabetic humans can be secured by the oral administration of N-p-tolylsulfonyl-N'-1-adamantylurea in daily dosage amounts in the range of about 25 to about 500 mg.

The compounds of this invention preferably are administered orally in one of the customary oral dosage forms; for example, compressed tablets or filled capsules, which contain the desired amount of medicament together with the customary binders, fillers and other excipients. Illustratively, N-p-tolylsulfonyl-N'-1-adamantylurea can be processed into tablets suitable for oral administration by the following procedure: 1424 g. of the adamantylurea are mixed with 399 g. of starch, 20 g. of granular gelatin, and 37 g. of magnesium stearate, and the mixture is pressed into scored tablets, of such size that each tablet contains 50 mg. of N-p-tolylsulfonyl-N'-1-adamantylurea.

This invention is further illustrated by the following examples:

EXAMPLE 1

Preparation of N-p-Tolylsulfonyl-N'-1-Adamantylurea 0.3 mole of ethyl N-p-tolylsulfonylcarbamate was mixed with 0.33 mole of 1-adamantylamine in 600 ml. of toluene, thus forming the carbamate salt of 1-adamantylamine. The resulting mixture was heated to refluxing temperature for about 5 hours, thus pyrolyzing the carbamate salt with the consequent formation of N-p-tolylsulfonyl-N'-1-adamantylurea. The reaction mixture was evaporated to dryness in vacuo. The residue containing N-p-tolylsulfonyl-N'-1-adamantylurea was dissolved in chloroform and the chloroform solution was filtered to remove a small quantity of undesired impurities. The chloroform solution was twice extracted with 250-ml. portions of 5 percent aqueous hydrochloric acid and once with 250 ml. of a saturated sodium chloride solution. The chloroform solution was then dried and after drying was concentrated by boiling to one-half of its original volume. An equal volume of hexane was added to the hot chloroform solution, thus causing the precipitation of N-p-tolylsulfonyl-N'-1-adamantylurea. The precipitate was separated by filtration. N-p-tolylsulfonyl-N'-1-adamantylurea thus prepared melted at about 169–171° C. after recrystallization from the same solvent mixture.

Analysis.—Calc.: C, 62.04; H, 6.94; N, 8.04. Found: C, 62.08; H, 6.87; N, 8.23.

Following the above procedure, ethyl N-p-ethylphenylsulfonylcarbamate was reacted with 1-adamantylamine to form a salt which was pyrolyzed to form N-p-ethylphenylsulfonyl-N'-1-adamantylurea melting at about 153–155° C. after recrystallization from ethanol.

Analysis.—Calc.: C, 62.95; H, 7.23; N, 7.73. Found: C, 63.13; H, 7.39; N, 7.81.

Following the above procedure, ethyl N-p-chlorophenylsulfonylcarbamate was reacted with 1-adamantylamine to form a salt which was pyrolyzed to form N-p-chlorophenylsulfonyl-N'-1-adamantylurea melting at about 150–151° C. after recrystallization from ethanol.

*Analysis.*—Calc.: C, 55.35; H, 5.74; N, 7.59. Found: C, 55.89; H, 6.04; N, 7.37.

Following the above procedure, ethyl N-p-methylmercaptophenylsulfonylcarbamate was reacted with 1-adamantylamine to form a salt which was pyrolyzed to form N-p-methylmercaptophenylsulfonyl-N'-1-adamantylurea melting at about 155–158° C. after recrystallization from ethanol.

*Analysis.*—Calc.: C, 56.81; H, 6.36; N. 7.36. Found: C, 56.78; H, 5.87; N, 7.28.

EXAMPLE 2

*Preparation of Sodium Salt of N-p-Tolylsulfonyl-N'-1-Adamantylurea*

0.5 g. of N-p-tolylsulfonyl-N'-1-adamantylurea was dissolved in chloroform and the chloroform solution was shaken with a slight excess of a 10 percent aqueous sodium carbonate solution, thus forming the sodium salt of N-p-tolylsulfonyl-N'-1-adamantylurea. The salt was isolated by filtration and was a white amorphous solid.

In the above reaction, magnesium hydroxide, ammonium hydroxide, or potassium hydroxide solutions can be used in place of the sodium carbonate solution to provide the corresponding magnesium, ammonium or potassium salts of the substituted urea. Other soluble carbonates such as potassium carbonate can also be used in place of sodium carbonate, and other solvents such as diethylether can be employed in place of chloroform.

Cationic salts of other sulfonylureas provided by this invention are prepared in an analogous fashion.

Adamantylamine, a starting material in each of the above preparations, can be prepared according to the process of Stetter et al., Berichte, 93, 296 (1960), by the reaction of 1-bromadamantane with acetonitrile to yield 1-acetamidoadamantane, which compound is in turn hydrolyzed with base to yield 1-adamantylamine. This process suffers from the disadvantage that the method of preparing 1-bromadamantane involves a laborious procedure and the use of liquid bromine as a solvent is extremely hazardous. 1-adamantylamine can be prepared by the above procedure from 1-chloradamantane. In another aspect of this invention, there is provided an improved method for preparing a 1-haloadamantane such as 1-chloradamantane and 1-bromadamantane. In this novel process, a 1-haloadamantane is prepared by reacting adamantane with a tertiary alkyl halide such as t-butyl chloride or t-butyl bromide in the presence of aluminum chloride or other Lewis acid as a catalyst and using an inert dispersing medium such as a hydrocarbon solvent. 1-chloradamantane or 1-bromadamantane, when thus prepared, is then reacted as above with acetonitrile in the presence of sulfuric acid to give 1-acetamidoadamantane, which compound is in turn readily hydrolyzed to yield the desired 1-adamantylamine.

The preparation of 1-chloradamantane by this novel process is illustrated by the following preparation:

PREPARATION I

A mixture of 100 ml. of t-butyl chloride, 350 ml. of cyclohexane, and 100 g. of adamantane was prepared in a one-liter, three-neck, round-bottom flask equipped with a thermometer and a mechanical stirrer. The third neck of the flask was closed off with a tube containing anhydrous calcium chloride. 4 g. of aluminum chloride were added to the reaction mixture in 0.5 g. quantities over a period of about 8 hours with one-hour intervals between additions. During this time the reaction mixture was stirred slowly in order to disperse the catalyst. After the addition of the aluminum chloride had been completed, the reaction mixture was cooled to about 10° C. Next, 100 ml. of 1 N hydrochloric acid was added to the reaction mixture followed by 500 ml. of ether. The organic layer was separated, was extracted with 50 ml. of cold water, and was dried. The ether was removed by evaporation in vacuo, leaving a residue containing chiefly 1-chloradamantane with about 5–10 percent of adamantane as an impurity. Recrystallization of the residue from anhydrous ethanol yielded 1-chloradamantane melting at about 158–160° C., uncorr.

In the above preparation, other Lewis acids such as aluminum tribromide, boron trifluoride, polyphosphoric acid, and the like can be used in place of aluminum chloride in effecting the chlorination of adamantane with a tertiary alkyl halide. Furthermore, other tertiary alkyl halides such as t-amyl chloride, and the like derived from low-boiling tertiary hydrocarbons can be employed in place of t-butyl chloride in the above reaction with equally satisfactory results.

1-bromadamantane is prepared by substituting t-butyl bromide for t-butyl chloride in the above procedure.

I claim:

1. A member of the class consisting of a compound and its nontoxic cationic salts, said compound being represented by the formula:

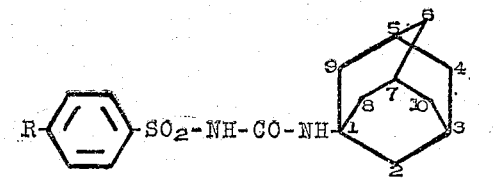

wherein R is a member of the group consisting of hydrogen, alkyl, alkyl-O—, alkyl-S—, and halo, wherein alkyl is a lower alkyl group.

2. N-p-(lower alkyl)phenylsulfonyl - N'-1 - adamantylurea.

3. N-p-tolylsulfonyl-N'-1-adamantylurea.

4. N-p-ethylphenylsulfonyl-N'-1-adamantylurea.

5. N-p-chlorophenylsulfonyl-N'-1-adamantylurea.

6. N-p-methylmercaptophenylsulfonyl-N'-1-adamantylurea.

References Cited in the file of this patent

UNITED STATES PATENTS

| | | |
|---|---|---|
| 2,573,676 | Campbell | Nov. 6, 1951 |
| 2,574,165 | Bender et al. | Nov. 6, 1951 |
| 2,975,212 | Wagner et al. | Mar. 14, 1961 |
| 2,976,317 | Ruschig et al. | Mar. 21, 1961 |

OTHER REFERENCES

Stetter et al.: Chemische Berichte, vol. 92, pp. 1629–1635 (1959).